United States Patent
Bian (10) Patent No.: US 11,536,902 B1
(45) Date of Patent: Dec. 27, 2022

(54) EDGE COUPLERS WITH METAMATERIAL RIB FEATURES

(71) Applicant: GLOBALFOUNDRIES U.S. Inc., Malta, NY (US)

(72) Inventor: Yusheng Bian, Ballston Lake, NY (US)

(73) Assignee: GlobalFoundries U.S. Inc., Malta, NY (US)

(*) Notice: Subject to any disclaimer, the term of this patent is extended or adjusted under 35 U.S.C. 154(b) by 0 days.

(21) Appl. No.: 17/369,253

(22) Filed: Jul. 7, 2021

(51) Int. Cl.
*G02B 6/122* (2006.01)
*G02B 6/13* (2006.01)
*G02B 6/12* (2006.01)

(52) U.S. Cl.
CPC ............ *G02B 6/1228* (2013.01); *G02B 6/13* (2013.01); *G02B 2006/12061* (2013.01); *G02B 2006/12147* (2013.01)

(58) Field of Classification Search
CPC .................................................. G02B 6/1228
See application file for complete search history.

(56) References Cited

U.S. PATENT DOCUMENTS

| 10,816,726 | B1 | 10/2020 | Peng et al. | |
|---|---|---|---|---|
| 10,989,876 | B1 | 4/2021 | Peng et al. | |
| 2003/0007719 | A1* | 1/2003 | Forrest | G02B 6/12004 385/14 |
| 2006/0274995 | A1* | 12/2006 | Lee | G02B 6/12011 385/37 |
| 2008/0187018 | A1* | 8/2008 | Li | H01L 21/02538 372/50.11 |
| 2014/0098833 | A1* | 4/2014 | Kim | H01S 5/1838 372/44.011 |
| 2015/0063753 | A1* | 3/2015 | Evans | G02B 6/34 438/31 |
| 2019/0377237 | A1* | 12/2019 | George | G02F 1/035 |

OTHER PUBLICATIONS

Sahin et al., "Methods of Forming a V-Groove for a Fiber Optics Cable on an Integrated Photonics Chip" filed Mar. 3, 2020 as U.S. Appl. No. 16/807,11.
Bian et al., "Edge Couplers With Stacked Layering" filed Apr. 27, 2020 as U.S. Appl. No. 16/859,347.
Yusheng Bian, "Edge Couplers With a Partially-Etched Inverse Taper", filed Aug. 5, 2020 as U.S. Appl. No. 16/985,645.

(Continued)

*Primary Examiner* — Charlie Y Peng
(74) *Attorney, Agent, or Firm* — Thompson Hine LLP; Anthony Canale (57) ABSTRACT

Structures for an edge coupler and methods of fabricating a structure for an edge coupler. A waveguide core includes a waveguide core section that has a first notched sidewall, a second notched sidewall, and an end surface connecting the first notched sidewall to the second notched sidewall. Segments are positioned with a spaced arrangement adjacent to the end surface of the waveguide core section, and a slab layer is adjoined to the segments, the first notched sidewall of the waveguide core section, the second notched sidewall of the waveguide core section, and the end surface of the waveguide core section. The segments and the waveguide core section have a first thickness, and the slab layer has a second thickness that is less than the first thickness.

20 Claims, 11 Drawing Sheets

(56) References Cited

OTHER PUBLICATIONS

Yusheng Bian, "Optical Couplers for Ridge-to-Rib Waveguide Core Transitions", filed Mar. 23, 2021 as U.S. Appl. No. 17/209,689.

Pavel Cheben et al., "Refractive index engineering with subwavelength gratings for efficient microphotonic couplers and planar waveguide multiplexers," Opt. Lett. 35, 2526-2528 (2010).

Pavel Cheben et al., "Broadband polarization independent nanophotonic coupler for silicon waveguides with ultra-high efficiency," Opt. Express 23, 22553-22563 (2015).

Xin Mu, et al., "Edge Couplers in Silicon Photonic Integrated Circuits: A Review", Applied Sciences 10, No. 4: 1538, Feb. 24, 2020.

G. Roelkens, et al., "Laser emission and photodetection in an InP/InGaAsP layer integrated on and coupled to a Silicon-on-Insulator waveguide circuit," Opt. Express 14, 8154-8159 (2006).

J. V. Galan et al., "CMOS compatible silicon etched V-grooves integrated with a SOI fiber coupling technique for enhancing fiber-to-chip alignment," 2009 6th IEEE International Conference on Group IV Photonics, 2009, pp. 148-150.

K. Giewont et al., "300-mm Monolithic Silicon Photonics Foundry Technology," in IEEE Journal of Selected Topics in Quantum Electronics, vol. 25, No. 5, pp. 1-11, Sep.-Oct. 2019, Art No. 8200611.

Y. Bian et al., "3D Integrated Laser Attach Technology on 300-mm Monolithic Silicon Photonics Platform," 2020 IEEE Photonics Conference (IPC), 2020, pp. 1-2.

M. Rakowski, et al., "45nm CMOS—Silicon Photonics Monolithic Technology (45CLO) for next-generation, low power and high speed optical interconnects," in Optical Fiber Communication Conference (OFC) 2020, OSA Technical Digest (Optical Society of America, 2020), paper T3H.3.

Y. Bian, et al., "Towards low-loss monolithic silicon and nitride photonic building blocks in state-of-the-art 300mm CMOS foundry," in Frontiers in Optics / Laser Science, B. Lee, C. Mazzali, K. Corwin, and R. Jason Jones, eds., OSA Technical Digest (Optical Society of America, 2020), paper FW5D.2.

B. Peng, et al., "A CMOS Compatible Monolithic Fiber Attach Solution with Reliable Performance and Self-alignment," In Optical Fiber Communication Conference (OFC) 2020, OSA Technical Digest (Optical Society of America, 2020), paper Th3I.4.

B. Peng, et al., "Controlling optical return loss in production silicon photonic metamaterial fiber couplers," Opt. Lett. 46, 400-403 (2021).

Bian et al., "Monolithically Integrated Silicon Nitride Platform" OFC Jun. 10, 2021.

Bian et al., "Hybrid III-v Laser Integration on a Monolithic Silicon Photonic Platform" OFC Jun. 7, 2021.

* cited by examiner

EDGE COUPLERS WITH METAMATERIAL RIB FEATURES

BACKGROUND

The present invention relates to photonics chips and, more specifically, to structures for an edge coupler and methods of fabricating a structure for an edge coupler.

Photonics chips are used in many applications and systems including, but not limited to, data communication systems and data computation systems. A photonics chip integrates optical components, such as waveguides, photodetectors, modulators, and optical power splitters, and electronic components, such as field-effect transistors, into a unified platform. Among other factors, layout area, cost, and operational overhead may be reduced by the integration of both types of components on the same chip.

An edge coupler, also known as a spot-size converter, is commonly used for coupling light of a given mode from a laser or an optical fiber to optical components on the photonics chip. The edge coupler may include a waveguide core section that defines an inverse taper and that is located adjacent to the laser or optical fiber. Corresponding to a direction of mode propagation, an inverse taper refers to a tapered section of a waveguide core characterized by a gradual increase in width along the mode propagation direction. In the edge coupler construction, the narrow end of the inverse taper provides a facet that is arranged proximate to the laser or optical fiber, and the wide end of the inverse taper is connected to another waveguide core section that routes the light to the optical components of the photonics chip.

The gradually-varying cross-section area of an inverse taper supports mode transformation and mode size variation associated with mode conversion when light is transferred from the laser or optical fiber to the photonics chip. The narrow end at the tip of the inverse taper is unable to fully confine the incident mode because the cross-section area of the tip at its narrow end is smaller than the mode size. Consequently, a significant percentage of the electromagnetic field of the incident mode is distributed about the tip of the inverse taper. As its width increases, the inverse taper can support the entire incident mode and eventually confine the electromagnetic field inside the inverse taper.

Edge couplers may exhibit significant insertion loss, as well as exhibit significant back reflection at the facet. Edge couplers may be characterized by a low coupling efficiency because of mismatches in mode shape and mode size with the laser or optical fiber. Edge couplers may also be susceptible to power-related damage because of poor power handling capability. Edge couplers may also have a low fabrication tolerance, as well as being lengthy and occupying an inordinate amount of space in the layout area.

Improved structures for an edge coupler and methods of fabricating a structure for an edge coupler are needed.

SUMMARY

In an embodiment of the invention, a structure for an edge coupler is provided. The structure includes a waveguide core having a waveguide core section. The waveguide core section has a first notched sidewall, a second notched sidewall, and an end surface connecting the first notched sidewall to the second notched sidewall. The structure further includes a plurality of segments positioned with a spaced arrangement adjacent to the end surface of the waveguide core section, and a slab layer adjoined to the plurality of segments, the end surface of the waveguide core section, the first notched sidewall of the waveguide core section, and the second notched sidewall of the waveguide core section. The plurality of segments and the waveguide core section have a first thickness, and the slab layer has a second thickness that is less than the first thickness.

In an embodiment of the invention, a method of forming a structure for an edge coupler is provided. The method includes forming a waveguide core having waveguide core section. The waveguide core section has a first notched sidewall, a second notched sidewall, and an end surface connecting the first notched sidewall to the second notched sidewall. The method further includes forming a plurality of segments positioned with a spaced arrangement adjacent to the end surface of the waveguide core section. The method further includes forming a slab layer adjoined to the plurality of segments, the end surface of the waveguide core section, the first notched sidewall of the waveguide core section, and the second notched sidewall of the waveguide core section. The plurality of segments and the waveguide core section have a first thickness, and the slab layer has a second thickness that is less than the first thickness.

BRIEF DESCRIPTION OF THE DRAWINGS

The accompanying drawings, which are incorporated in and constitute a part of this specification, illustrate various embodiments of the invention and, together with a general description of the invention given above and the detailed description of the embodiments given below, serve to explain the embodiments of the invention. In the drawings, like reference numerals refer to like features in the various views.

DETAILED DESCRIPTION

With reference to FIGS. 1, 2, 2A, 2B, 2C, 2D and in accordance with embodiments of the invention, a structure 10 for an edge coupler includes multiple segments 12 and a waveguide core 28 having a waveguide core section 16 and a waveguide core section 18. The segments 12 and the waveguide core sections 16, 18 may be arranged lengthwise along a longitudinal axis 20. The waveguide core section 16 is longitudinally positioned between the segments 12 and the waveguide core section 18. The structure 10 may have a length in a range from two hundred (200) microns to three (3) millimeters.

Laser light may be directed laterally from a source 22 (FIG. 4) toward the structure 10. The laser light may have a given wavelength, intensity, mode shape, and mode size, and the structure 10 may provide spot size conversion for the laser light. In an embodiment, the source 22 may be a semiconductor laser. In an embodiment, the source 22 may be an optical fiber. The source 22 is placed adjacent to the structure 10 following subsequent fabrication stages and during a subsequent assembly phase, as described below. The gap or space between the source 22 and the structure 10 may be filled by air or an index-matching material, or may include one or more lenses.

The segments 12 are located as features in a portion of the structure 10 that initially receives the laser light from the source 22. One of the segments 12 terminates the structure 10 to define a facet, and the source 22 (FIG. 4) is eventually positioned adjacent to the facet. Light propagates within the structure 10 in a direction from the segments 12 toward the waveguide core sections 16, 18. The segments 12 constitute discrete pegs that are arranged with a spaced arrangement along the longitudinal axis 20. Adjacent pair of segments 12 are separated by a gap. Each segment 12 has opposite sidewalls 80 that border the gaps, as well as opposite sidewalls 82 at its side edges. In an embodiment, the segments 12 may be centered relative to the longitudinal axis 20.

Figure 1:
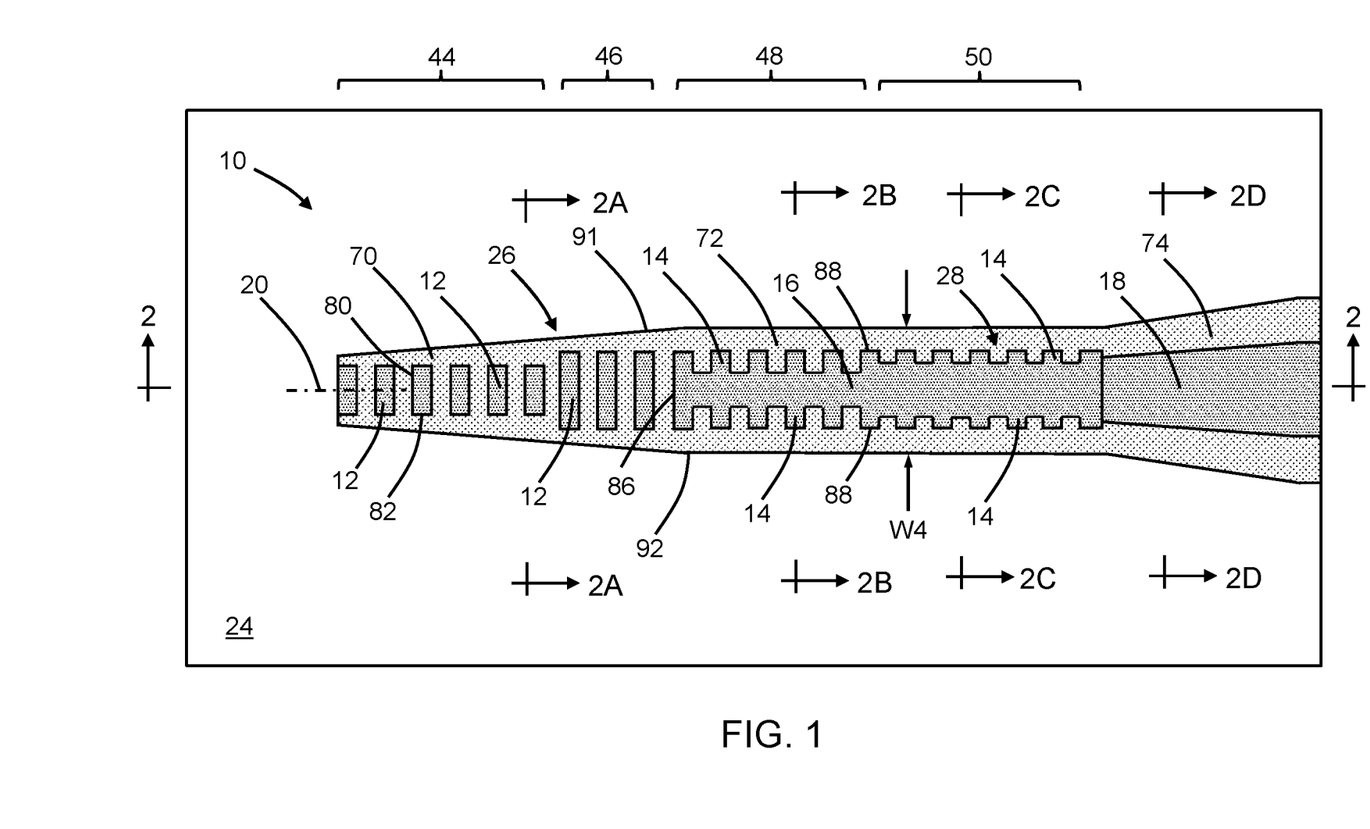
FIG. 1 is a top view of a structure at an initial fabrication stage of a processing method in accordance with embodiments of the invention.

The waveguide core section 16 is located in a portion of the structure 10 that transfers the laser light from the segments 12 to the waveguide core section 18. The waveguide core section 16 includes notched sidewalls 88 and an end surface 86 extending between and connecting the notched sidewalls 88. The waveguide core section 16 is a "fishbone" structure that includes a series of projections 14 as features that are arranged along each of its opposite notched sidewalls 88. The opposite notched sidewalls 88 include indentations or grooves defining notches between adjacent pairs of the projections 14. The segments 12 may be positioned in a row adjacent to the end surface 86, and the end surface 86 may terminate the waveguide core section 16. The projections 14 are positioned in respective spaced arrangements along the longitudinal axis 20 and extend outwardly in respective directions that are transverse to the longitudinal axis 20. In an embodiment, the waveguide core section 16 may be centered relative to the longitudinal axis 20.

The segments 12 may have a width dimension W1 measured between the opposite sidewalls 80, and the waveguide core section 16 may have a width dimension W2 measured between its opposite notched sidewalls 88. The segments 12 may be grouped into a group 44 at an end of the structure 10 that includes the facet and a group 46 that is arranged between the group 44 and the waveguide core section 16. In an embodiment, the width dimension W1 of the segments 12 in the group 46 may be greater than the width dimension W1 of the segments 12 in the group 44. In an embodiment, the width dimension W1 of the segments 12 may range from about 0.07 times to about 0.16 times the wavelength of the laser light being received from the source 22. In an embodiment, the width dimension W2 of the waveguide core section 16 may range from about 0.2 times to about 0.28 times the wavelength of the light being received from the source 22. The wavelength of the laser light being received by the structure 10 may be, for example, in a range of 1260 nm to 1360 nm (the O-band).

In an embodiment, the pitch and duty cycle of the segments 12 may be uniform to define a periodic arrangement. In alternative embodiments, the pitch and/or the duty cycle of the segments 12 may be apodized (i.e., non-uniform) to define a non-periodic arrangement. In an embodiment, the segments 12 may have a rectangular patterned shape. In alternative embodiments, the segments 12 may have a different patterned shape, such as an oval shape or a trapezoidal shape.

The waveguide core section 16 may have a portion 48 that is located adjacent to the segments 12 and a portion 50 that is located adjacent to the waveguide core section 18. The notches between adjacent projections 14 extend laterally inward (i.e., transverse to the longitudinal axis 20) to a greater depth within the portion 48 than within the portion 50. In an embodiment, the pitch and duty cycle of the projections 14 may be uniform to define a periodic arrangement. In alternative embodiments, the pitch and/or the duty cycle of the projections 14 may be apodized (i.e., non-uniform) to define a non-periodic arrangement. In an embodiment, the pitch and duty cycle of the projections 14 may differ from the pitch and duty cycle of the segments 12. In an embodiment, the projections 14 may have a rectangular patterned shape. In alternative embodiments, the projections 14 may have a different patterned shape, such as an oval shape or a trapezoidal shape.

The waveguide core section 18, which is continuous and unnotched, may have opposite sidewalls 90 and a width dimension W3 that varies with position along the longitudinal axis 20 (i.e., inversely tapers) in a direction of light propagation. In an embodiment, the width dimension W3 of the waveguide core section 18 may increase with increasing distance from the waveguide core section 16. In an embodiment, the width dimension W3 of the waveguide core section 18 may vary over its length based on a linear function to provide a trapezoidal shape with a trapezoidal profile viewed in a vertical direction. In an alternative embodiment, the width dimension W3 of the waveguide core section 18 may vary over its length based on a non-linear function, such as a quadratic, parabolic, or exponential function.

Figure 2:
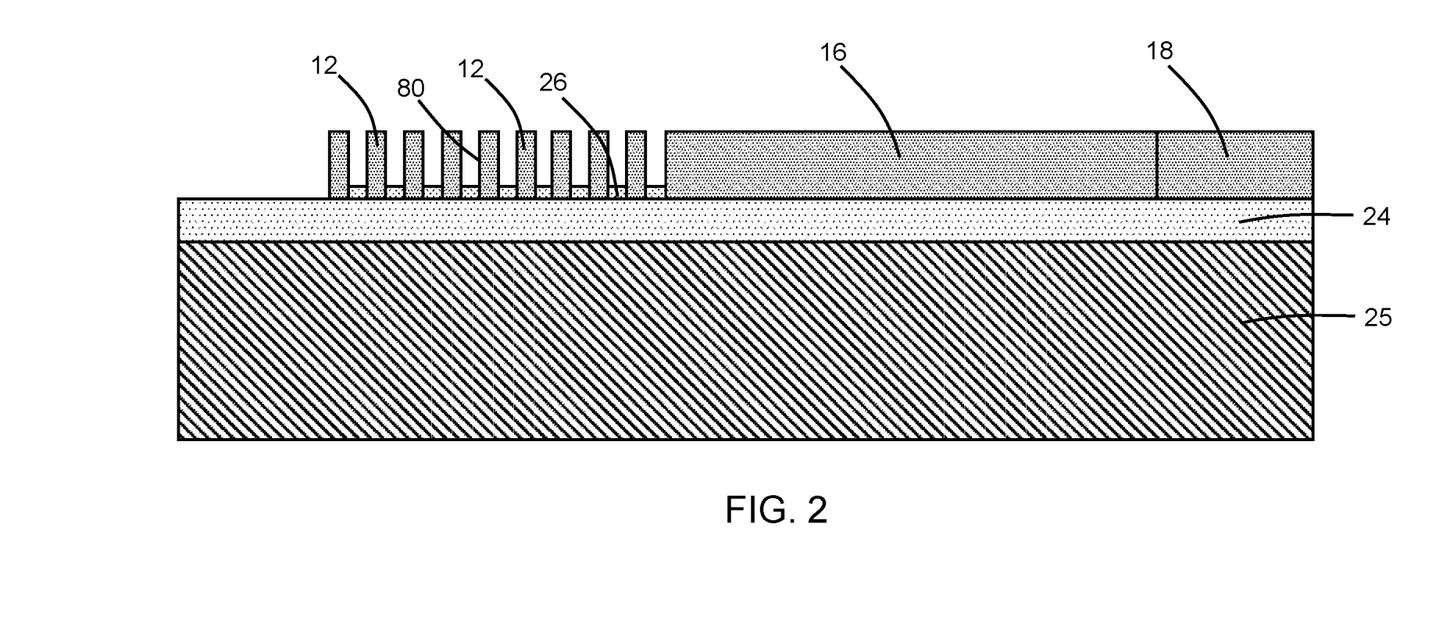
FIG. 2 is a cross-sectional view of the structure taken generally along line 2-2 in FIG. 1.
Figure 2A:
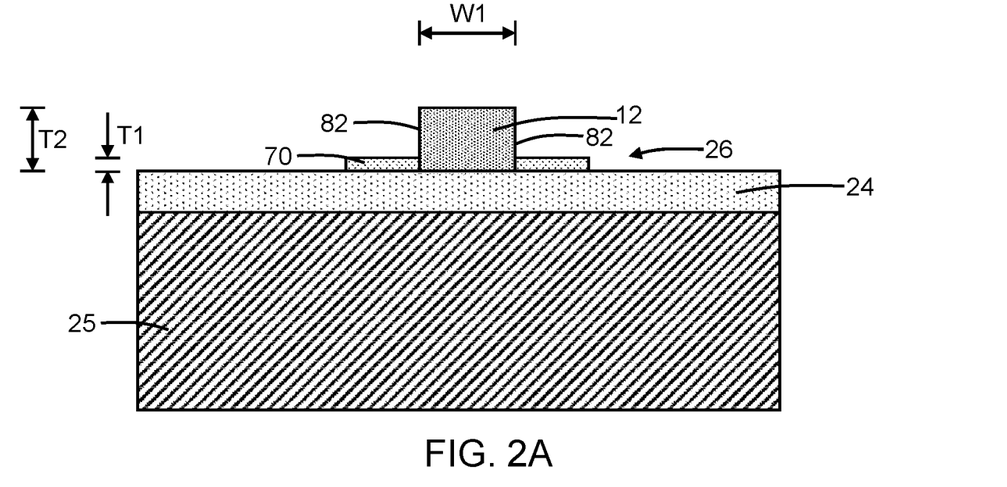
FIG. 2A is a cross-sectional view of the structure taken generally along line 2A-2A in FIG. 1.
Figure 2B:
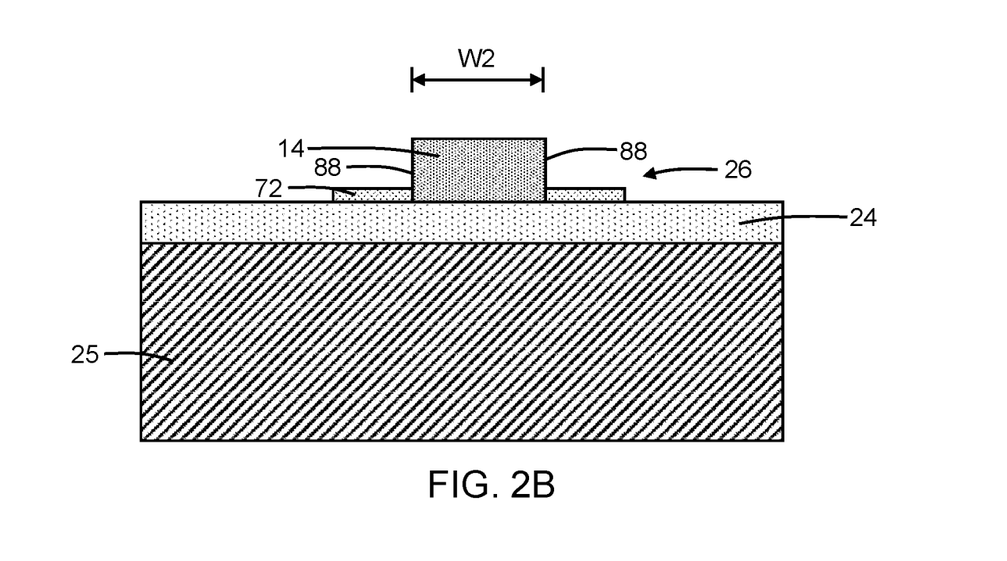
FIG. 2B is a cross-sectional view of the structure taken generally along line 2B-2B in FIG. 1.
Figure 2C:
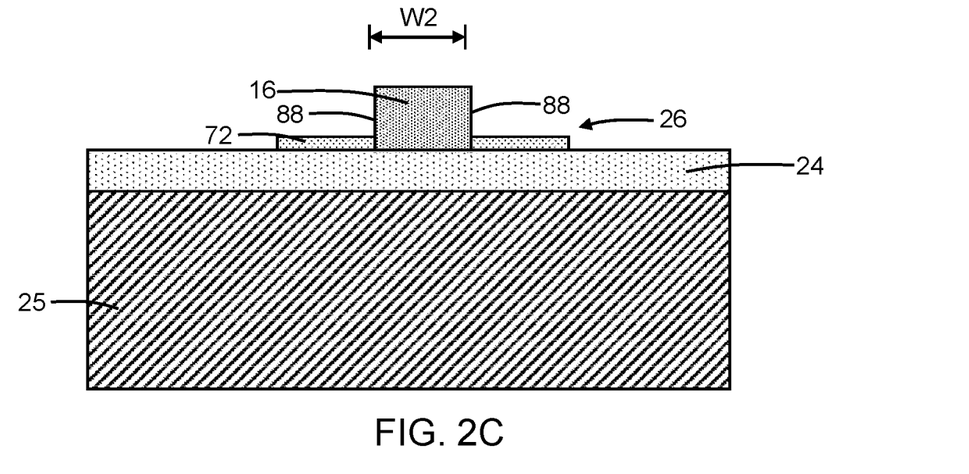
FIG. 2C is a cross-sectional view of the structure taken generally along line 2C-2C in FIG. 1.
Figure 2D:
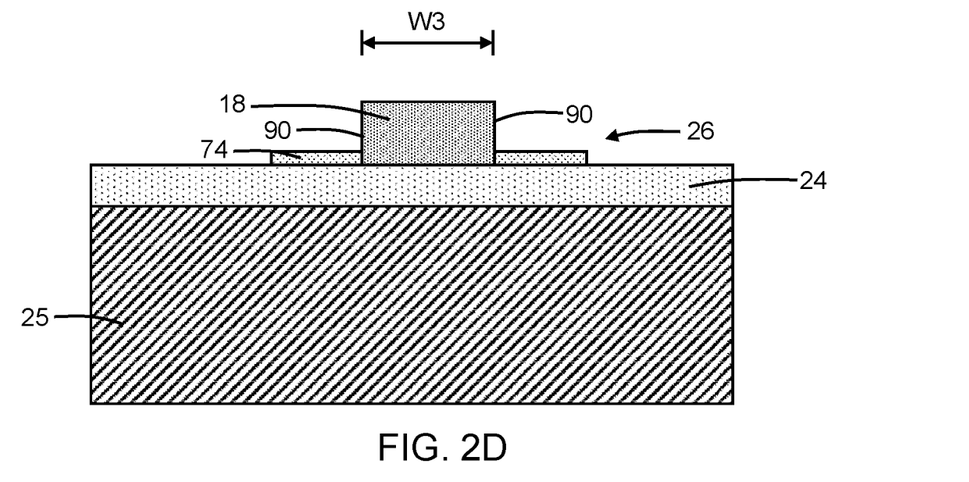
FIG. 2D is a cross-sectional view of the structure taken generally along line 2D-2D in FIG. 1.

The segments 12 and waveguide core 28 may be positioned over a dielectric layer 24. In an embodiment, the dielectric layer 24 may be comprised of silicon dioxide. In an embodiment, the dielectric layer 24 may be a buried oxide layer of a silicon-on-insulator substrate, and the silicon-on-insulator substrate may further include a handle substrate 25 comprised of a semiconductor material (e.g., single-crystal silicon).

The segments 12 and the waveguide core 28 may be comprised of a semiconductor material, such as single-crystal silicon. In an embodiment, the segments 12 and the waveguide core 28 may be concurrently formed by patterning a single-crystal silicon device layer of a silicon-on-insulator substrate with lithography and etching processes. In an embodiment, the segments 12 and the waveguide core 28 may be patterned from the device layer by lithography and etching processes without etching fully through the device layer to initially form a slab layer 26 and, subsequently, the slab layer 26 may be patterned to shape with a separate set of lithography and etching processes from the partially-etched portions of the device layer. The dielectric layer 24 may operate as an etch stop when patterning the slab layer 26.

The slab layer 26 is thinner than the segments 12 and the waveguide core sections 16, 18. In an embodiment, the slab layer 26 has a thickness T1 that is significantly less than the thickness T2 of the segments 12 and the waveguide core sections 16, 18. The slab layer 26 is adjoined to lower portions of the segments 12 and the waveguide core 28 over a height equal to the thickness T1. In particular, the slab layer 26 includes a portion 70 that is adjoined to the lower portions of the segments 12 at the sidewalls 80, 82, a portion 72 that is adjoined to lower portions of the waveguide core section 16 at the notched sidewalls 88 and end surface 86, and a portion 74 that is adjoined to lower portions of the waveguide core section 18 at the sidewalls 90. The segments 12 are embedded in (i.e., surrounded by) the portion 70 of the slab layer 26 over the thickness T1. The portion 72 of the slab layer 26 is positioned in part within the notches indented into the notched sidewalls 88 of the waveguide core section 16.

The slab layer 26 has a side edge 91 and a side edge 92 opposite from the side edge 91. The segments 12 and the waveguide core sections 16, 18 are laterally arranged between, and inwardly spaced from, the side edge 91 and the side edge 92. The slab layer 26 has a width dimension W4 between the side edges 91, 92 that varies among the different portions 70, 72, 74 of the slab layer 26. The portion 70 of the slab layer 26 is tapered such that the width dimension W4 of the portion 70 of the slab layer 26 increases with increasing distance from the facet. In an embodiment, the portion 72 of the slab layer 26 may be non-tapered such that the width dimension W4 of the portion 72 of the slab layer 26 is constant. The portion 74 of the slab layer 26 may be tapered such that the width dimension W4 of the portion 74 of the slab layer 26 increases with increasing distance from the portion 72.

The segments 12, the waveguide core sections 16, 18, and the slab layer 26 define a rib waveguide structure. The waveguide core 28 guides the laser light from the structure 10 to other optical components on the photonics chip, such as a modulator or a photodetector.

The segments 12 and projections 14 may be positioned at small enough pitch along the longitudinal axis 20 so as not to radiate or reflect light at the wavelength of operation and to act as an effective optical material known as a metamaterial. The segments 12 and projections 14, along with the adjoined slab layer 26, define metamaterial rib features in the structure 10. The segments 12 effectively provide a sub-wavelength tapered grating because the size of these features is smaller than the light wavelength. The projections 14 effectively provide another sub-wavelength grating because the size of these features is smaller than the light wavelength.

In alternative embodiments, the segments 12, the waveguide core 28 including the waveguide core sections 16, 18, and the slab layer 26 may be comprised of silicon nitride. In alternative embodiments, the segments 12, the waveguide core 28 including the waveguide core sections 16, 18, and the slab layer 26 may be comprised of silicon oxynitride, aluminum nitride, a III-V compound semiconductor material, silicon germanium, germanium, a polymer, etc. instead of either silicon or silicon nitride.

With reference to FIGS. 3, 3A, 3B, 3C, 3D in which like reference numerals refer to like features in FIGS. 2, 2A, 2B, 2C, 2D and at a subsequent fabrication stage, one or more dielectric layers 30 are formed over the segments 12 and waveguide core 28. The one or more dielectric layers 30 may be comprised of silicon dioxide and/or silicon nitride. A back-end-of-line stack 32 is formed over the one or more dielectric layers 30. The back-end-of-line stack 32 may include interlayer dielectric layers 34 comprised of silicon dioxide and intralayer dielectric layers 36 comprised of silicon-carbon nitride (e.g., nitrogen-doped silicon carbide) that alternate in a layer stack with the interlayer dielectric layers 34.

Figure 3:
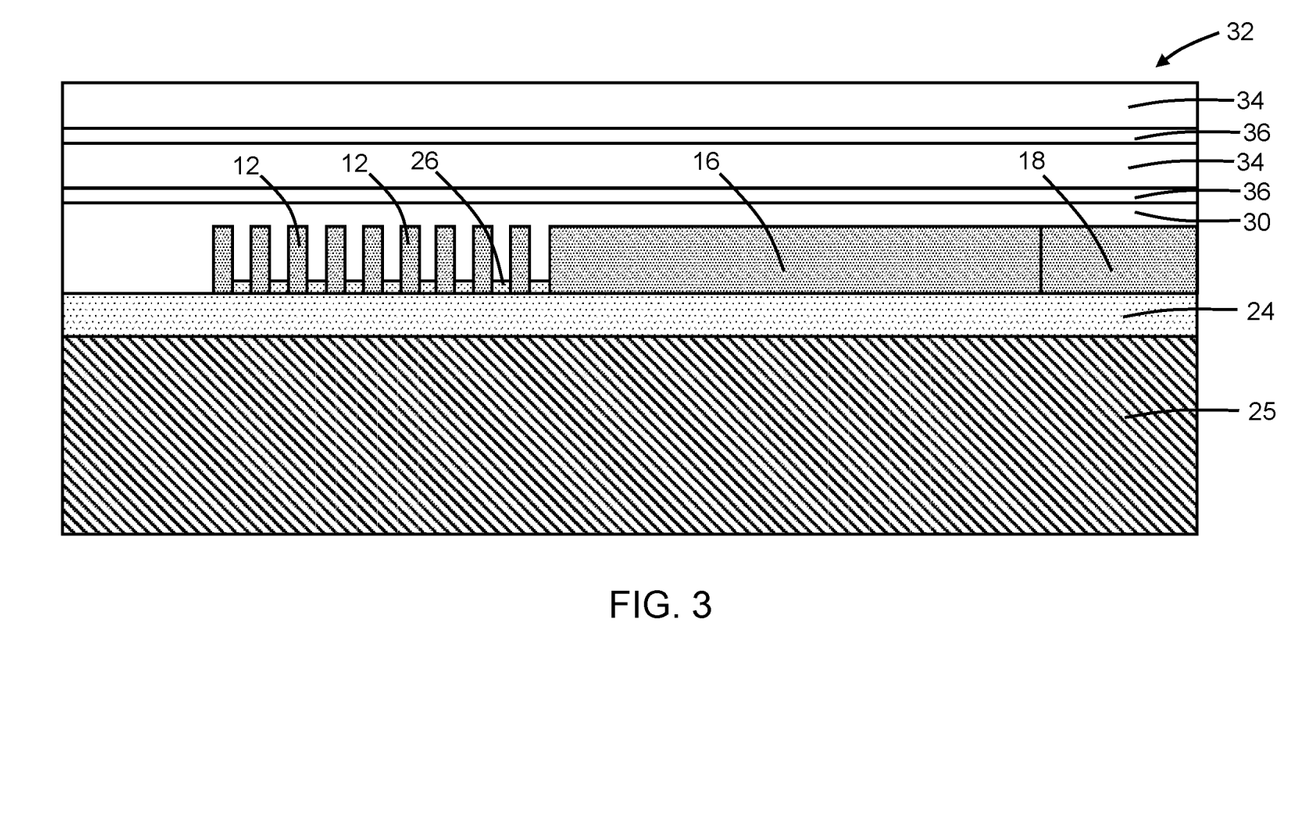
FIGS. 3, 3A, 3B, 3C, 3D are cross-sectional views of the structure at a fabrication stage of the processing method subsequent to FIGS. 2, 2A, 2B, 2C, 2D.
Figure 3A:
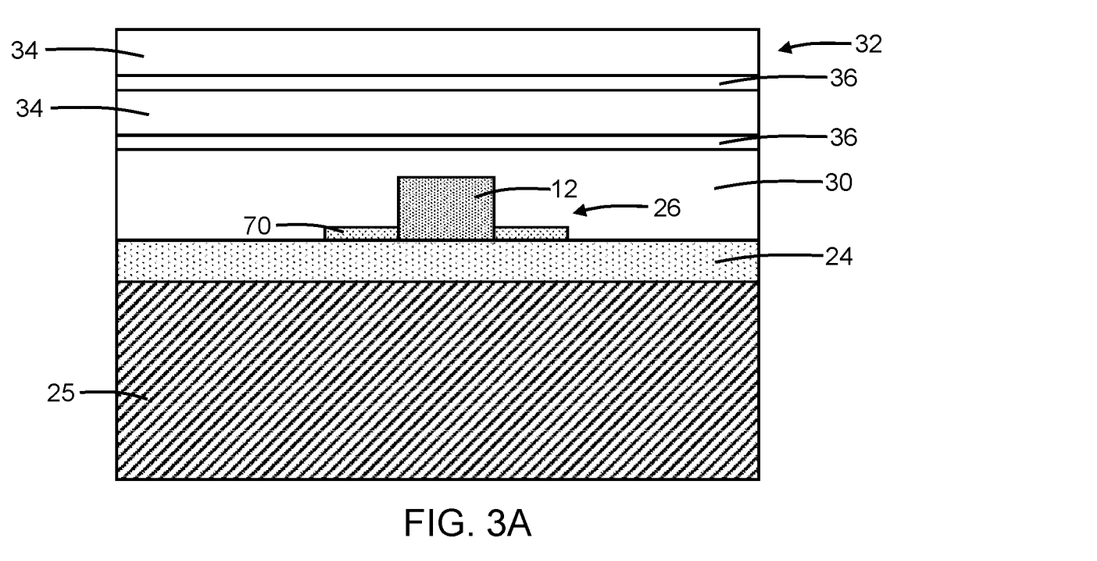
Figure 3B:
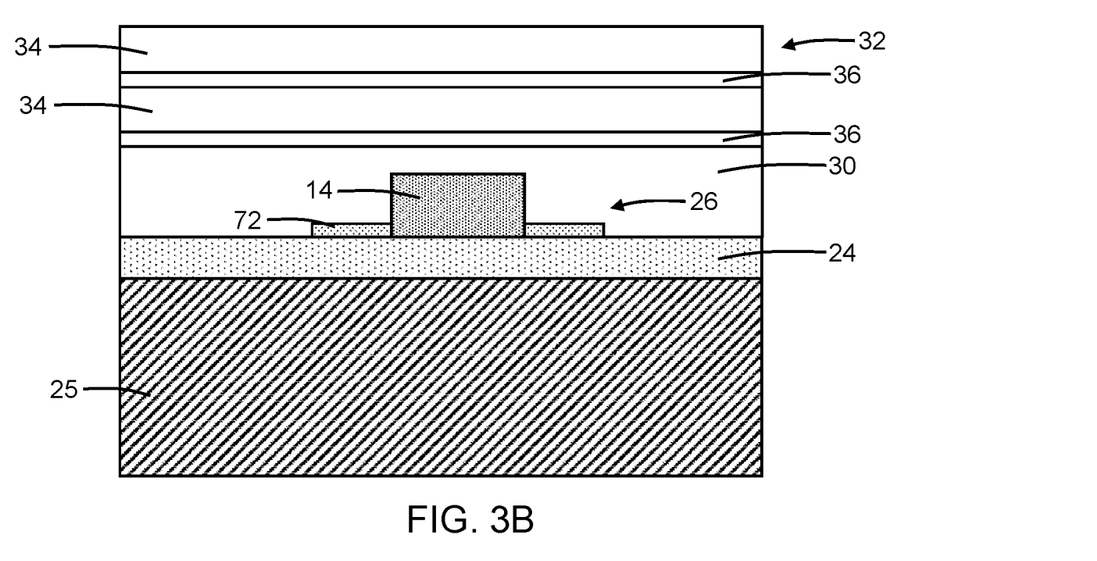
Figure 3C:
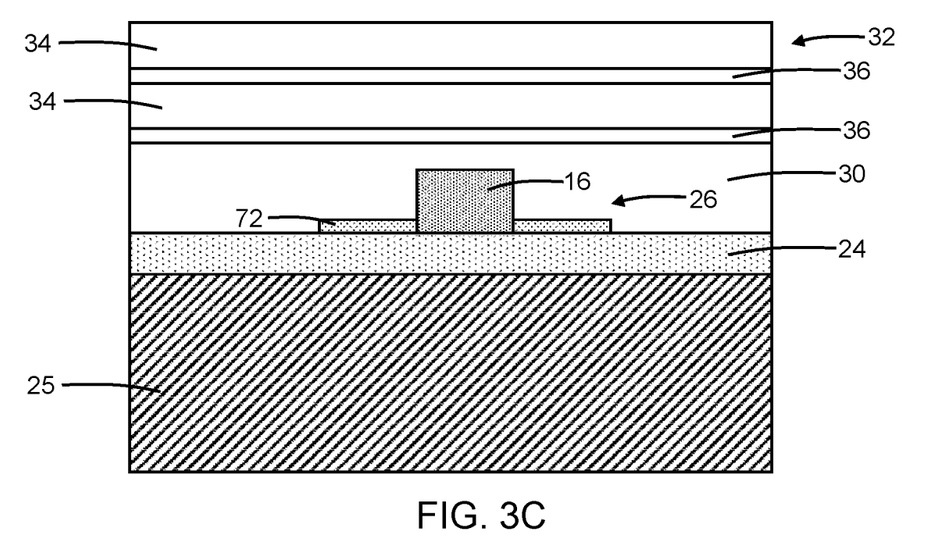
Figure 3D:
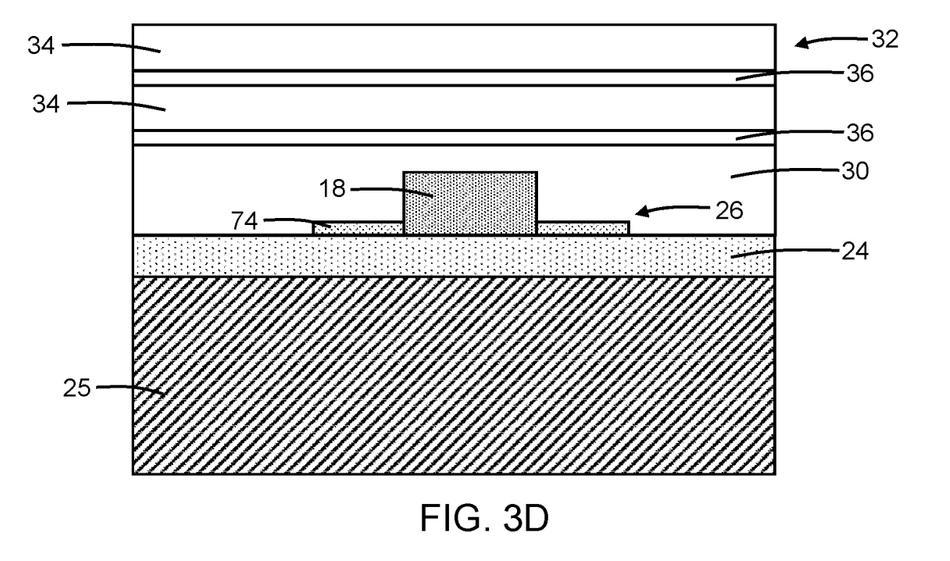
Figure 4:
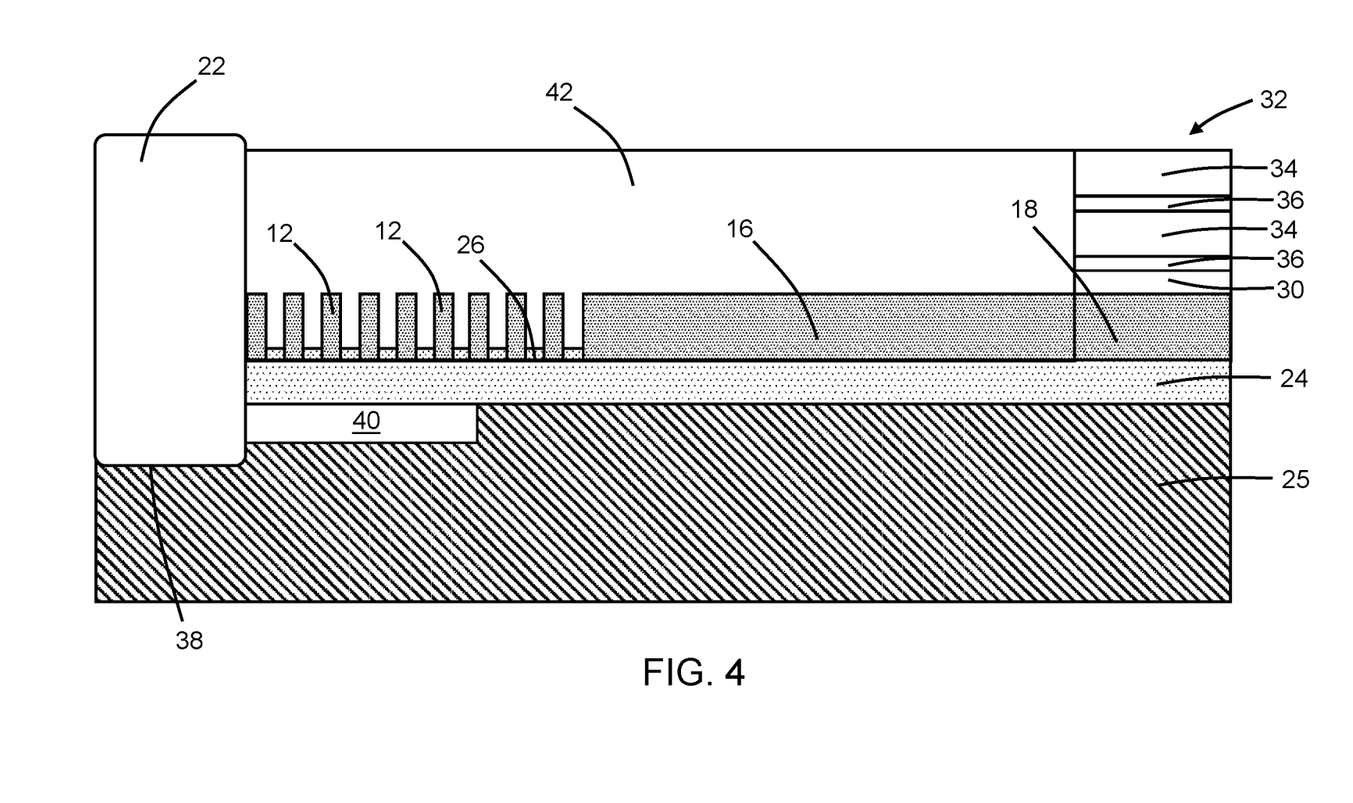
FIG. 4 is a cross-sectional view of the structure at a fabrication stage of the processing method subsequent to FIG. 3.

With reference to FIG. 4 in which like reference numerals refer to like features in FIG. 3 and at a subsequent fabrication stage, a portion of the back-end-of-line stack 32 may be removed by lithography and etching processes to expose a portion of the handle substrate 25, and a groove 38 may be formed in the exposed portion of the handle substrate 25 by lithography and etching processes. In an embodiment, the segments 12 and the waveguide core section 16 may be exposed by the removal of the portion of the back-end-of-line stack 32. In an embodiment, the segments 12 may terminate at the facet of the structure 10, which is defined at least in part by the formation of the groove 38. The source 22 is placed within the groove 38 adjacent to the facet.

The groove 38 may be formed by a multiple-step process culminating in a wet chemical etch characterized by etch rates dependent upon crystalline direction to endow the groove 38 with a V-shape or U-shape. The groove 38 may extend laterally in the handle substrate 25 beneath the dielectric layer 24 as an undercut 40 that is located under a portion of the structure 10. In an embodiment, the segments 12 may be located over the undercut 40. The undercut 40 may function to minimize substrate-induced leakage loss for the laser light originating from the source 22. In an alternative embodiment, the groove 38 may be formed in the handle substrate 25 without forming the undercut 40, which may be appropriate if, for example, the incoming mode of the laser light from the source 22 is small.

A dielectric layer 42 may be formed over the portion of the structure 10 from which the back-end-of-line stack 32 is removed. In an embodiment, the dielectric layer 42 may be formed over the segments 12 of the structure 10. The dielectric layer 42 is comprised of a dielectric material, such as silicon dioxide, and lacks the stacked layering of diverse dielectric materials present in the back-end-of-line stack 32.

The structure 10, in any of its embodiments described herein, may be integrated into a photonics chip that includes electronic components and additional optical components. For example, the electronic components may include field-effect transistors that are fabricated by CMOS processing.

The structure 10 may exhibit a significant improvement in insertion loss, as well as reduced back reflection at the facet, in comparison with a conventional edge coupler that merely includes a waveguide core section defining an inverse taper. The structure 10 may achieve a high coupling efficiency due to improved matching of mode shape and mode size with the source 22. The structure 10 may demonstrate a higher fabrication tolerance than a conventional edge coupler that merely includes a waveguide core section defining an inverse taper. The structure 10 may be shorter in length and, therefore, more compact than a conventional edge coupler that merely includes a waveguide core section defining an inverse taper. The length shortening conserves space on the photonics chip. The structure 10 may exhibit improved power handling in comparison with conventional edge couplers, which may reduce its susceptibility to power-related damage. The waveguide core 28, due to the slab layer 26 providing a rib waveguide structure, may directly interface with an optical modulator downstream from the waveguide core section 18.

Figure 5:
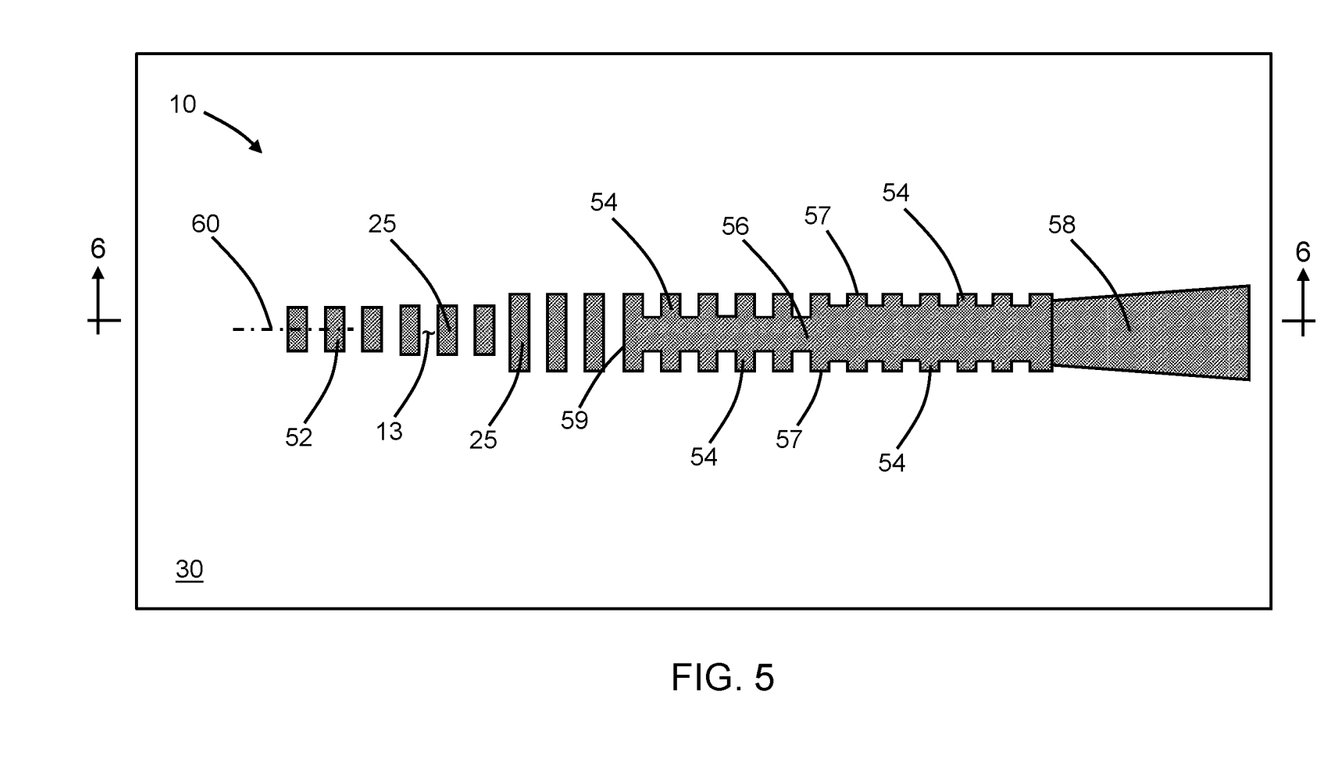
FIG. 5 is a top view of a structure in accordance with alternative embodiments of the invention.
Figure 6:
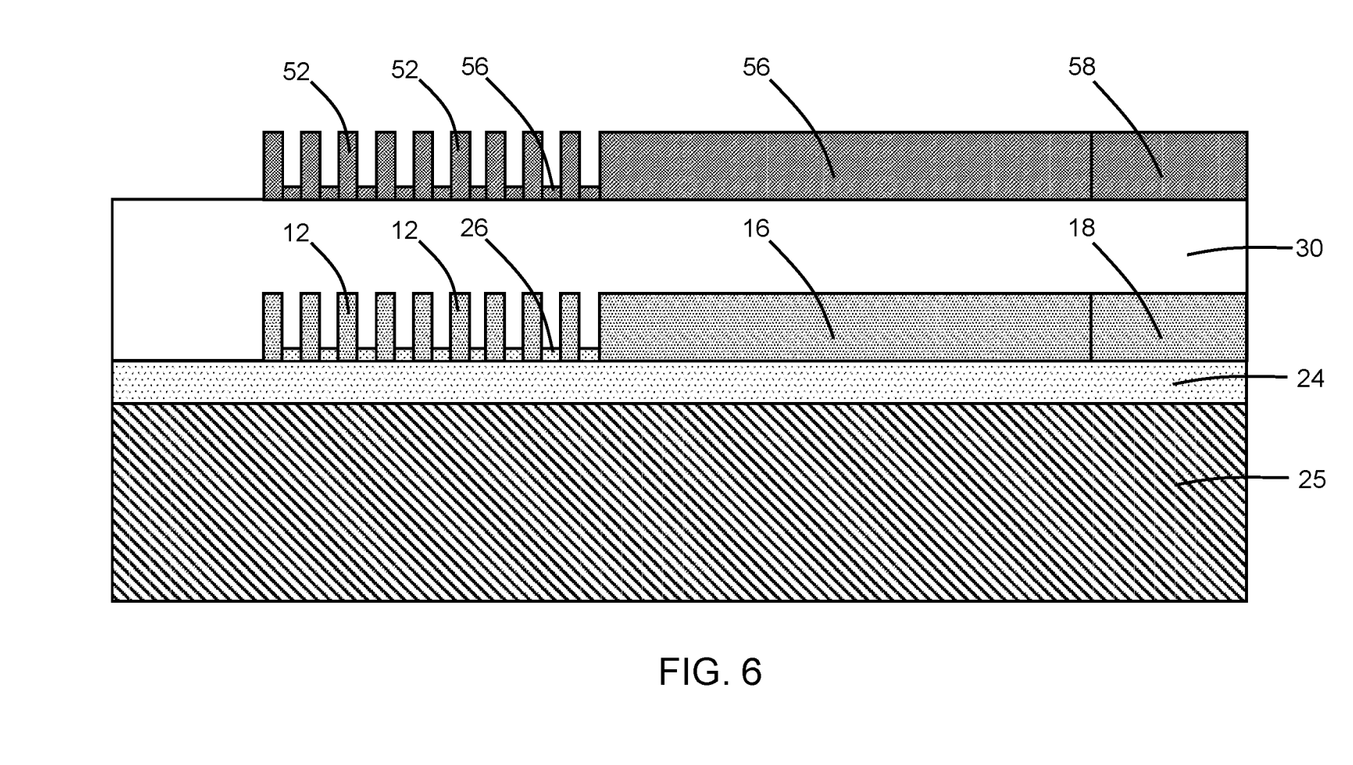
FIG. 6 is a cross-sectional view of the structure taken generally along line 6-6 in FIG. 5.

With reference to FIGS. 5, 6 and in accordance with alternative embodiments of the invention, the structure 10 may be modified to add features in a level over the level including the segments 12 and waveguide core 28. The additional features may include multiple segments 52, a waveguide core section 56 having projections 54, and a waveguide core section 58. The segments 52 and the waveguide core sections 56, 58 may be lengthwise arranged along a longitudinal axis 60. The waveguide core section 56 is longitudinally positioned between the segments 52 and the waveguide core section 58. In an embodiment, the segments 52 and the waveguide core sections 56, 58 may be centered relative to the longitudinal axis 60.

The segments 52 may be arranged over, and overlap with, the segments 12. The waveguide core section 56 may be arranged over, and overlap with, the waveguide core section 16, and the waveguide core section 58 may be arranged over, and overlap with, the waveguide core section 18. The waveguide core section 56 may have notched side surfaces 57 with notches defining indentations or grooves between adjacent pairs of the projections 54 and an end surface 59 connecting the notched side surfaces 57. The projections 64 are arranged in a spaced arrangement along the longitudinal axis 60 and extend outwardly transverse to the longitudinal axis 60. The segments 52 may be positioned adjacent to the end surface 59, and the end surface 59 may terminate the waveguide core section 56.

In an embodiment, the segments 52 and waveguide core sections 56, 58 may be comprised of a dielectric material, such as silicon nitride, and the segments 12 and waveguide core 28 including the waveguide core sections 16, 18 may be comprised of silicon. A layer of the dielectric material may be deposited on the one or more dielectric layers 30 and patterned by lithography and etching processes to form the segments 52 and waveguide core sections 56, 58. The introduction of a material other than silicon (e.g., silicon nitride) into the structure 10 may further reduce power-dependent losses during the transfer of optical power from the source 22 by the structure 10 to the optical components on the photonics chip.

Processing follows to form the back-end-of-line stack 32, groove 38, and optional undercut 40, as well as the dielectric layer 42 that replaces the removed portion of the back-end-of-line stack 32.

Figure 7:
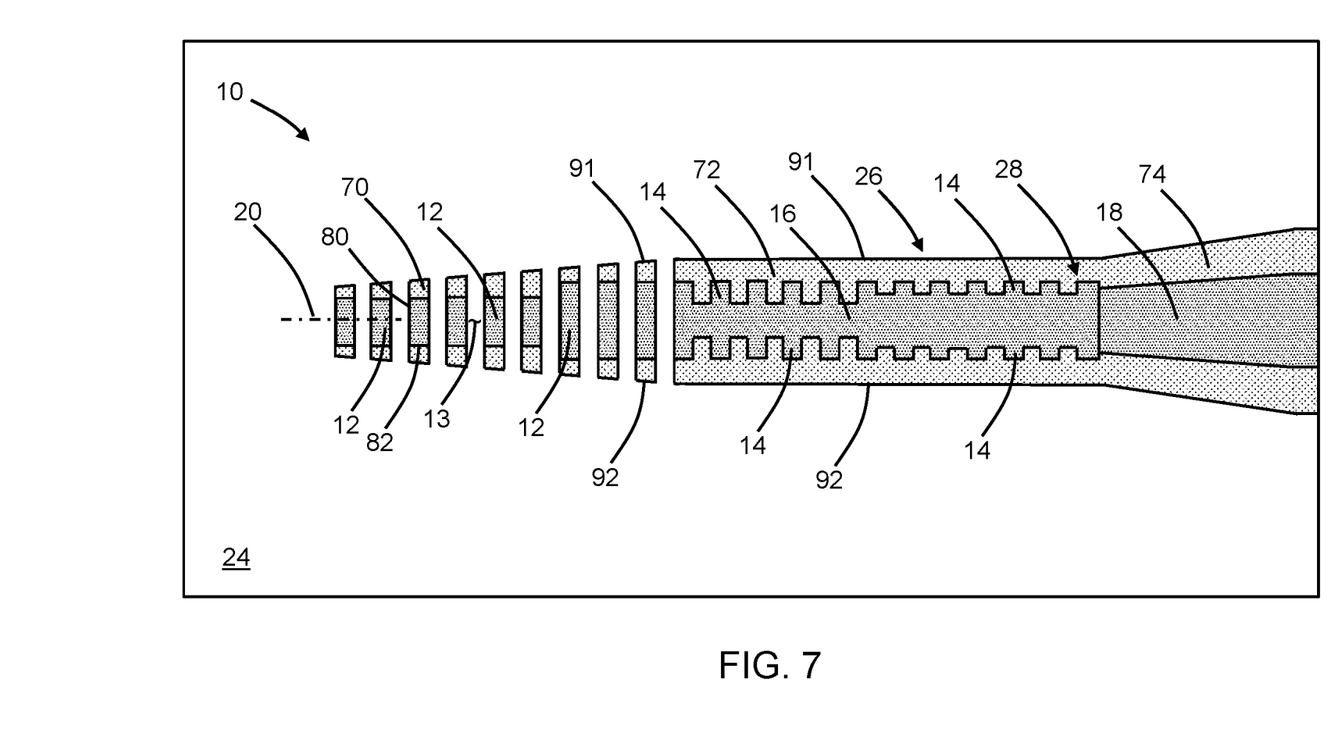
FIG. 7 is a top view of a structure in accordance with alternative embodiments of the invention.

With reference to FIG. 7 and in accordance with alternative embodiments of the invention, the structure 10 may be modified such that the portion 70 of the slab layer 26 is discontinuous and sectioned. Adjacent pairs of the segments 12 are separated by gaps 13 in the spaced arrangement along the longitudinal axis 20. The slab layer 26 is absent from gaps 13 between the sidewalls 84 of adjacent pairs of segments 12. The discontinuous portion 70 of the slab layer 26 includes sections respectively connected to the sidewalls 82 of the segments 12.

The methods as described above are used in the fabrication of integrated circuit chips. The resulting integrated circuit chips can be distributed by the fabricator in raw wafer form (e.g., as a single wafer that has multiple unpackaged chips), as a bare die, or in a packaged form. The chip may be integrated with other chips, discrete circuit elements, and/or other signal processing devices as part of either an intermediate product or an end product. The end product can be any product that includes integrated circuit chips, such as computer products having a central processor or smartphones.

References herein to terms modified by language of approximation, such as "about", "approximately", and "substantially", are not to be limited to the precise value specified. The language of approximation may correspond to the precision of an instrument used to measure the value and, unless otherwise dependent on the precision of the instrument, may indicate +/−10% of the stated value(s).

References herein to terms such as "vertical", "horizontal", etc. are made by way of example, and not by way of limitation, to establish a frame of reference. The term "horizontal" as used herein is defined as a plane parallel to a conventional plane of a semiconductor substrate, regardless of its actual three-dimensional spatial orientation. The terms "vertical" and "normal" refer to a direction perpendicular to the horizontal, as just defined. The term "lateral" refers to a direction within the horizontal plane.

A feature "connected" or "coupled" to or with another feature may be directly connected or coupled to or with the other feature or, instead, one or more intervening features may be present. A feature may be "directly connected" or "directly coupled" to or with another feature if intervening features are absent. A feature may be "indirectly connected" or "indirectly coupled" to or with another feature if at least one intervening feature is present. A feature "on" or "contacting" another feature may be directly on or in direct contact with the other feature or, instead, one or more intervening features may be present. A feature may be "directly on" or in "direct contact" with another feature if intervening features are absent. A feature may be "indirectly on" or in "indirect contact" with another feature if at least one intervening feature is present. Different features may overlap if a feature extends over, and covers a part of, another feature with either direct contact or indirect contact.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A structure for an edge coupler, the structure comprising:
    a waveguide core including a first waveguide core section, the first waveguide core section having an end surface;
    a first plurality of segments positioned with a first spaced arrangement adjacent to the end surface of the first waveguide core section; and
    a slab layer adjoined to the first plurality of segments and the end surface of the first waveguide core section, the slab layer having a first side edge, a second side edge, and a first portion connected to the first plurality of segments, and the first portion of the slab layer tapered with a first width dimension between the first side edge and the second side edge that increases with decreasing distance from the first waveguide core section,
    wherein the first plurality of segments are laterally positioned between the first side edge and the second side edge, the first plurality of segments and the first waveguide core section have a first thickness, and the slab layer has a second thickness that is less than the first thickness.

2. The structure of claim 1 wherein the first plurality of segments are embedded in the slab layer over a height equal to the second thickness.

3. The structure of claim 1 wherein the waveguide core further includes a second waveguide core section adjoined to the first waveguide core section, the second waveguide core section has the first thickness, the first waveguide core section is arranged between the second waveguide core section and the first plurality of segments, and the slab layer is adjoined to the second waveguide core section.

4. The structure of claim 1 wherein the slab layer has a second portion connected to the first waveguide core section, and the first waveguide core section is laterally positioned between the first side edge and the second side edge.

5. The structure of claim 4 wherein the second portion of the slab layer is non-tapered with a second width dimension between the first side edge and the second side edge that is constant.

6. The structure of claim 1 further comprising:
a substrate including a groove adjacent to the first plurality of segments; and
a dielectric layer,
wherein the first plurality of segments and the first waveguide core section are positioned on the dielectric layer, and the groove extends as an undercut beneath the dielectric layer and the first plurality of segments.

7. The structure of claim 1 wherein the first plurality of segments are distributed in a first group and a second group, the first group is positioned adjacent to the first waveguide core section, and the first plurality of segments in the first group have a larger width dimension than the first plurality of segments in the second group.

8. The structure of claim 1 further comprising:
a second plurality of segments positioned over the first plurality of segments, the second plurality of segments arranged in a second spaced arrangement along a longitudinal axis,
wherein the first plurality of segments comprise a first material, and the second plurality of segments comprise a second material having a different composition than the first material.

9. The structure of claim 8 further comprising:
a second waveguide core section including a first notched sidewall, a second notched sidewall, and an end surface connecting the first notched sidewall with the second notched sidewall, the second waveguide core section positioned over the first waveguide core section, and the second waveguide core section comprised of the second material.

10. The structure of claim 8 wherein the first material is silicon, and the second material is silicon nitride.

11. The structure of claim 1 wherein the first plurality of segments and the first waveguide core section are arranged along a longitudinal axis, adjacent pairs of the first plurality of segments are separated by gaps in the first spaced arrangement along the longitudinal axis, and the slab layer is absent from the gaps.

12. The structure of claim 1 wherein the first waveguide core section further includes a first notched sidewall and a second notched sidewall connected to the first notched sidewall by the end surface, and the slab layer is adjoined to the first notched sidewall of the first waveguide core section and the second notched sidewall of the first waveguide core section.

13. The structure of claim 1 wherein the first plurality of segments are arranged along a longitudinal axis, each of the first plurality of segments has a plurality of sidewalls, and the slab layer is adjoined to the plurality of sidewalls.

14. The structure of claim 13 wherein adjacent pairs of the first plurality of segments are separated by gaps in the first spaced arrangement, the plurality of sidewalls that border the gaps, and the slab layer is adjoined to the plurality of sidewalls.

15. The structure of claim 9 wherein the second plurality of segments are positioned adjacent to the end surface of the second waveguide core section.

16. A method of forming a structure for an edge coupler, the method comprising:
forming a waveguide core including a first waveguide core section, wherein the first waveguide core section has an end surface;
forming a first plurality of segments positioned with a first spaced arrangement adjacent to the end surface of the first waveguide core section; and
forming a slab layer adjoined to the first plurality of segments and the end surface of the first waveguide core section,
wherein the slab layer has a first side edge, a second side edge, and a first portion connected to the first plurality of segments, the first plurality of segments are laterally positioned between the first side edge and the second side edge, the first portion of the slab layer is tapered with a first width dimension between the first side edge and the second side edge that increases with decreasing distance from the first waveguide core section, the first plurality of segments and the first waveguide core section have a first thickness, and the slab layer has a second thickness that is less than the first thickness.

17. The method of claim 16 wherein the waveguide core includes a second waveguide core section adjoined to the first waveguide core section, the second waveguide core section has the first thickness, the slab layer is adjoined to the second waveguide core section, and the first waveguide core section is arranged between the second waveguide core section and the first plurality of segments.

18. The method of claim 16 wherein the slab layer is formed by patterning a device layer of a silicon-on-insulator substrate with lithography and etching processes.

19. The method of claim 16 wherein the slab layer has a second portion connected to the first waveguide core section, the first waveguide core section is laterally positioned between the first side edge and the second side edge, and the second portion of the slab layer is non-tapered with a width dimension between the first side edge and the second side edge that is constant.

20. The method of claim 16 further comprising:
forming a second plurality of segments positioned over the first plurality of segments,
wherein the first plurality of segments comprise silicon, and the second plurality of segments comprise silicon nitride.

* * * * *